June 10, 1941.  A. WEISENBURG  2,244,750
APPARATUS FOR MANUFACTURING CORK COMPOSITION MATERIAL
Filed Oct. 29, 1937  6 Sheets-Sheet 1

Inventor
Andrew Weisenburg.
By
Attorneys

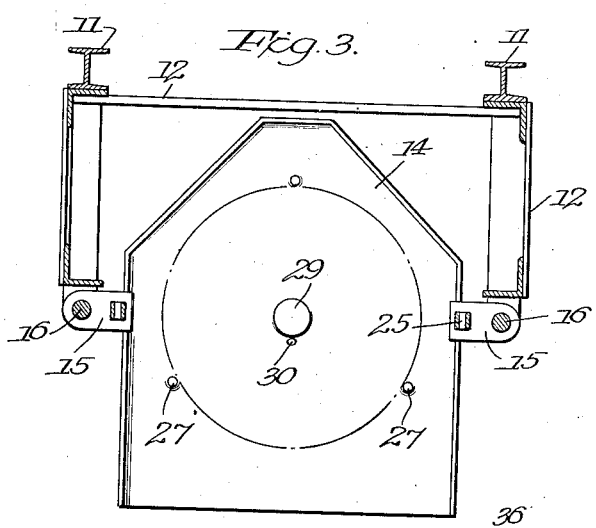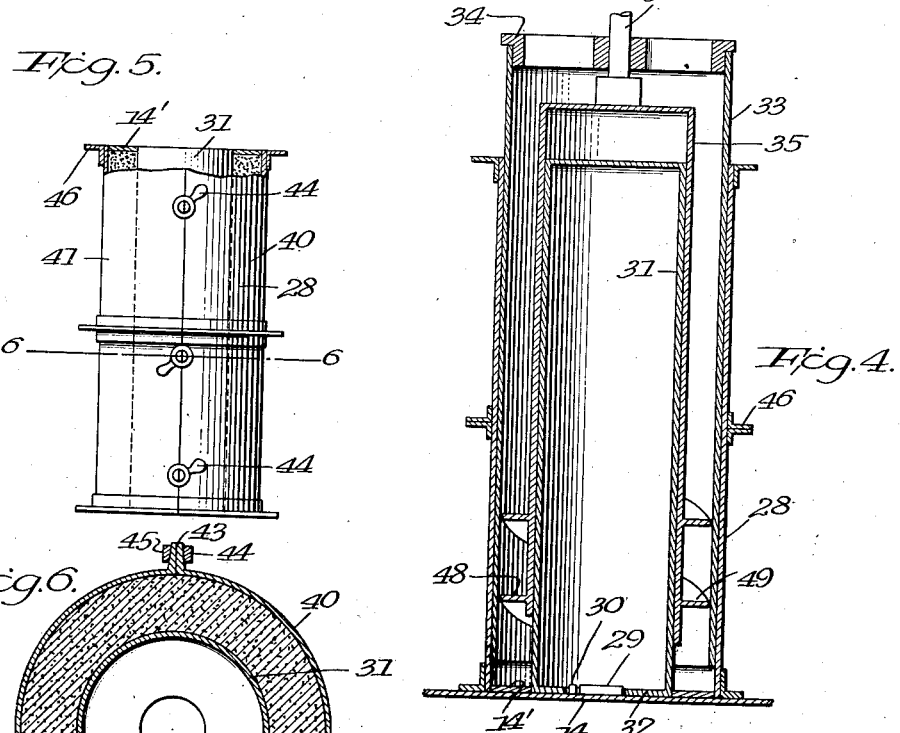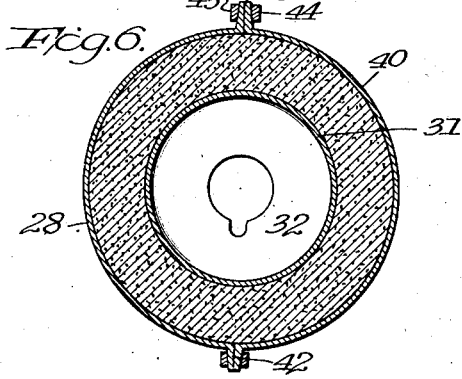

June 10, 1941. A. WEISENBURG 2,244,750
APPARATUS FOR MANUFACTURING CORK COMPOSITION MATERIAL
Filed Oct. 29, 1937 6 Sheets-Sheet 4
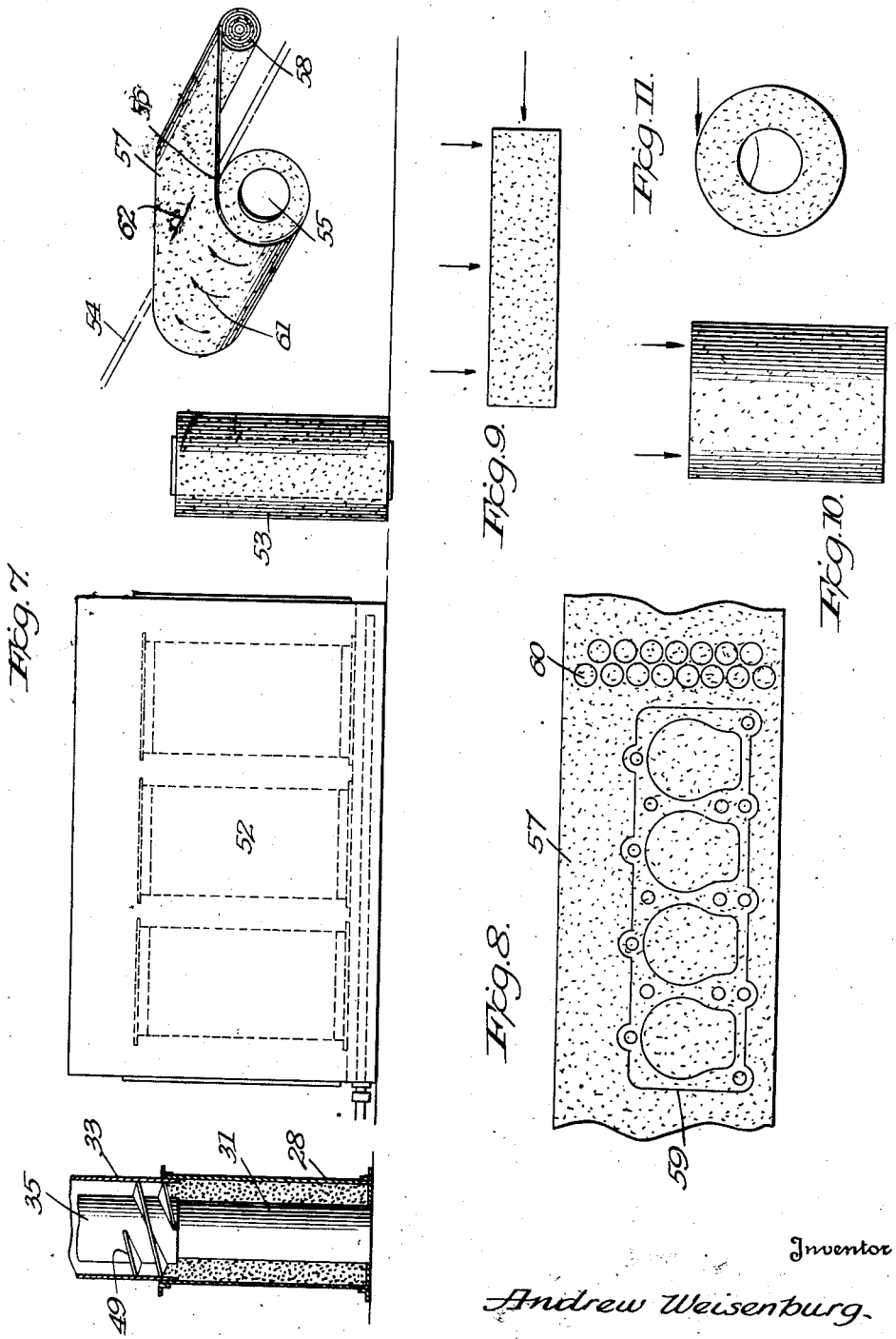
Inventor
Andrew Weisenburg
By
Attorneys

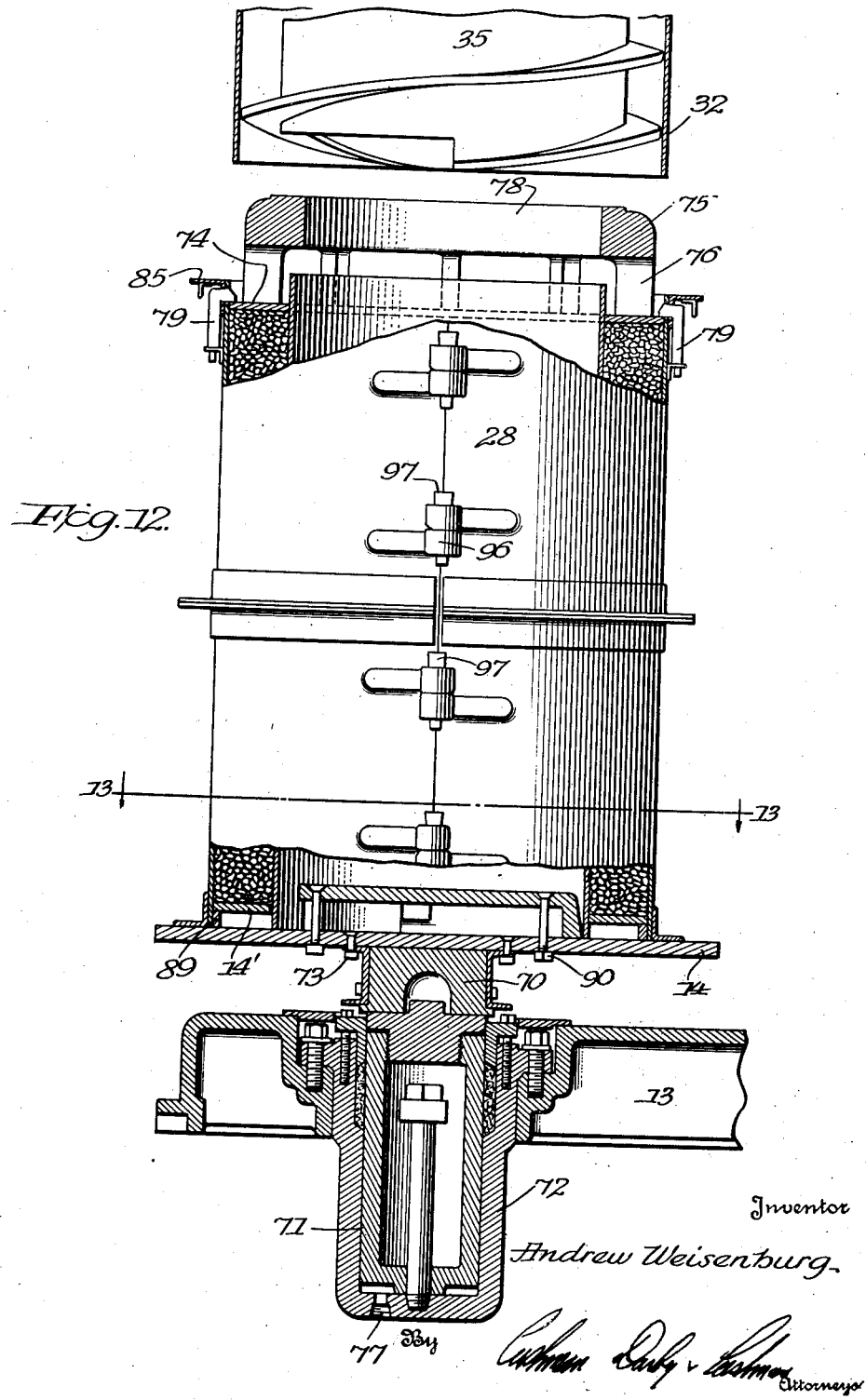

June 10, 1941.  A. WEISENBURG  2,244,750
APPARATUS FOR MANUFACTURING CORK COMPOSITION MATERIAL
Filed Oct. 29, 1937  6 Sheets-Sheet 6
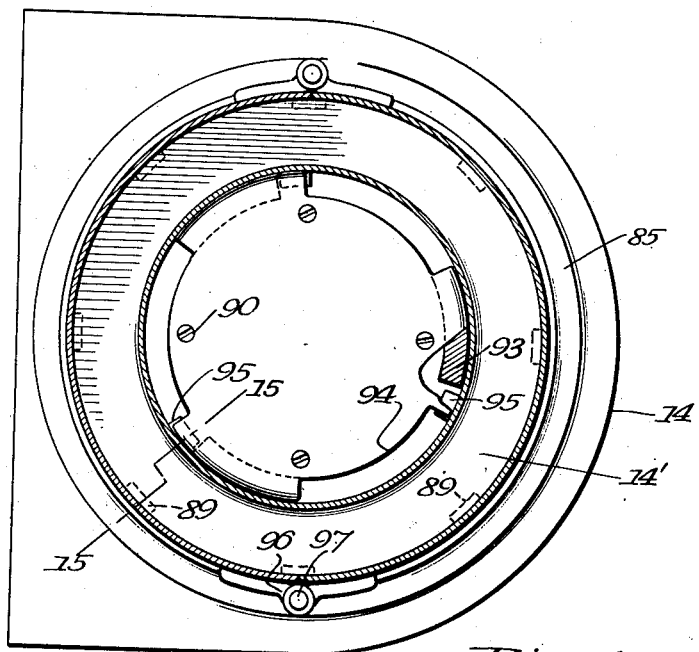
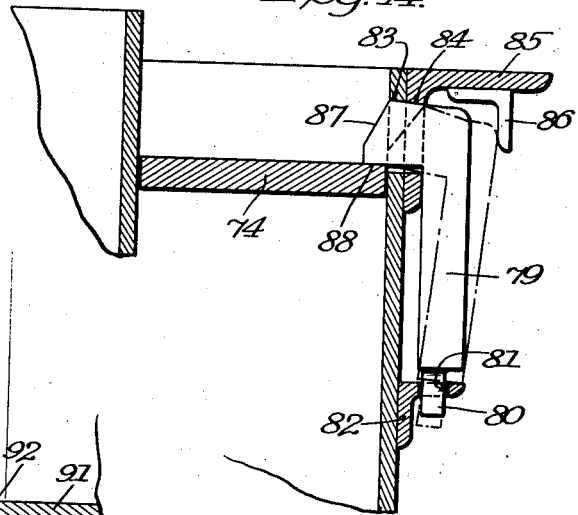
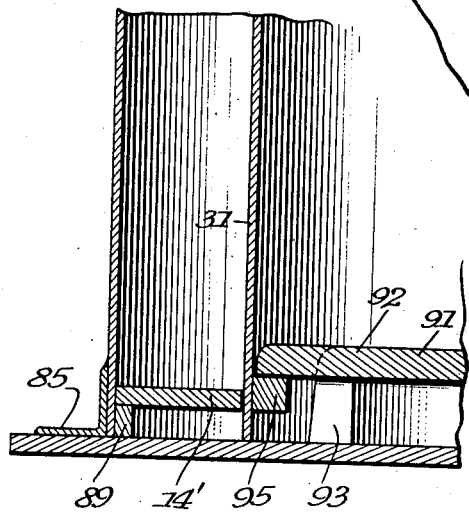
Inventor
Andrew Weisenburg
By  Cushman Darby & Cushman
Attorneys Patented June 10, 1941

2,244,750

UNITED STATES PATENT OFFICE 2,244,750

APPARATUS FOR MANUFACTURING CORK COMPOSITION MATERIAL

Andrew Weisenburg, Philadelphia, Pa., assignor to Crown Cork & Seal Company, Inc., Baltimore, Md., a corporation of New York Application October 29, 1937, Serial No. 171,798

10 Claims. (Cl. 18—5)

The present invention relates to an improved method and apparatus for molding cork composition into a body and for forming continuous sheet material from such molded body. By cork composition, I mean comminuted cork and a binder of such character that the mass may be compressed into various shapes and the binder cured or set to form a solid body material suitable for fabrication into various articles. In the present instance, the cork composition is molded to a cylindrical form and the sheet material in required dimensions is severed therefrom.

As distinguished from previous methods of molding, the present invention embodies a method wherein the cork composition is formed or extruded into a hollow cylindrical body by the simultaneous application of both a rotary pressure and an axial pressure.

Briefly stated, by reason of the application simultaneously of axial and rotary pressure, the cork particles occupy a position in the hollow cylinder which is the resultant of these two forces. Such position, I have discovered, enables the cylinder to be sheeted into a uniform strong sheet free from weakened areas. An important feature of the method is the formation of the hollow cylindrical cork body by a continuous feed of the cork into a mold having an annular cavity, whereby the body is continuously and progressively built up in the mold while at the same time the body is maintained continuously under axial pressure.

Another feature of the method resides in maintaining the cork mass substantially free and uncompressed substantially until it is introduced into the mold cavity. This permits the particles to adapt themselves freely and more or less independently of one another to the mold, as distinguished from the introduction of a substantially preformed mass, whereby a body of substantially uniform density is produced.

The method further embodies the cutting or severing of the cork composition from the cylinder in a continuous sheet by a tangential cutting, e. g., by rotating the cylinder of cork composition past a cutting blade disposed tangential to the cylinder, or vice versa. I find that by reason of the positioning of the particles as explained and the tangential cutting of the sheet, that the bond between the particles is not injured or destroyed. This is important for the reason that the cork predominates by volume and constitutes the body mass, and any undue pressure exerted upon the cork composition which would serve to distend the bond between the cork particles or to break it, would render the sheet weak and useless for practical purposes.

Thereafter such sheet is severed by a downward pressure, i. e., punching or cutting, to form various shaped articles, such as bottle cap liners, gaskets, and similar products. These articles will be characterized by enhanced tensile strength in all directions, because the severing of the sheet from a cylinder having the cork particles positioned as explained is accomplished with substantially none or a minimum of strain and without distending or destroying the bond between the cork particles.

The invention also comprises a machine whereby the cork composition cylinder will be extruded or formed by means of a rotary and axial pressure and in a single operation. The apparatus includes means for continuously exerting endwise or axial pressure at both ends of the cork cylinder simultaneously with the packing and extrusion of the cork composition. The cylinder is produced upon a core whereby it can be removed from the molding or extrusion apparatus and subsequently passed through an oven or other means to cure the binder and thereafter positioned upon the sheet severing machine.

In connection with the machine, moreover, the means for imparting rotary and axial pressure during packing and extrusion, consists of a novel screw arrangement whereby not only is the proper rotary pressure exerted but of equal importance, the distribution of the binder coated cork particles is such that a cylinder of uniform density is produced. An important feature of the machine from the standpoint of producing a cylinder of uniform density is that the construction and arrangement of the parts permits the introduction into the mold cavity of substantially free and uncompressed cork as distinguished from substantially compressed or preformed cork strips or ribbons. This permits the particles to be uniformly distributed throughout the body and to produce a body substantially uniform in its density throughout.

Other objects and advantages of the invention will become apparent from the following description when taken in conjunction with the accompanying claims and drawings.

Referring to the drawings, wherein is disclosed a preferred embodiment of the apparatus for carrying out my method:

Figure 1:
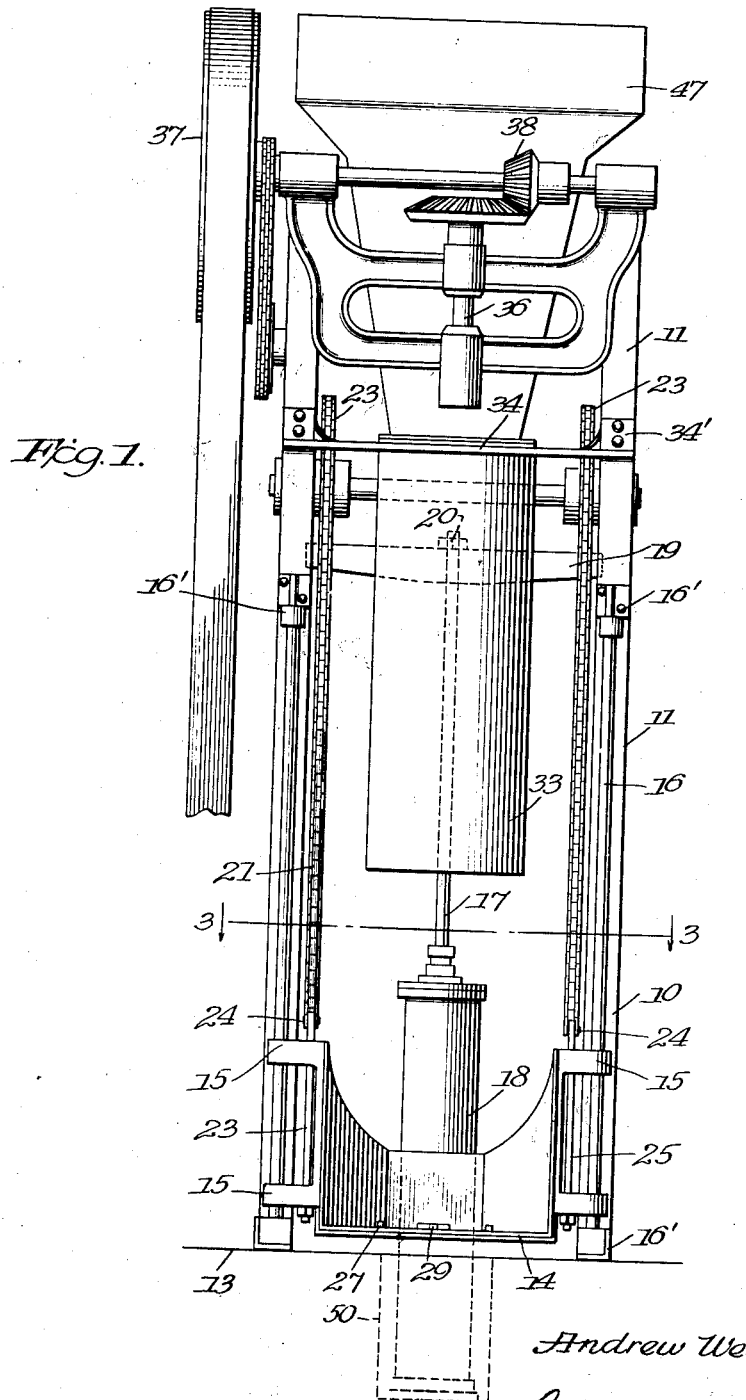
Figure 1 is a front view of the feeding and packing machine, with the mold removed from the platform.

Figure 3 is a sectional view taken substantially along the line 3—3 of Figure 1;

Figure 4 is an enlarged detail axial sectional view of the mold and its associated parts;

Figure 5 is a side view of the outer cylinder of the mold;

Figure 6 is a sectional view taken substantially along the line 6—6 of Figure 5;

Figure 7 is a view showing the sequence of steps employed in forming a continuous strip of material from a cylindrical body in accordance with my invention;

Figure 8 is a composite plan view of a sheet of material showing an article such as an automotive gasket and cap liner formed therefrom;

Figure 9 is a view showing a conventional cork composition block, the vertical arrows indicating the direction of the pressure and the horizontal arrow the direction of cutting into sheets;

Figure 10 is a view showing a conventional cork composition cylinder formed by the action of a reciprocating plunger or packer working in a tube, the arrows indicating the direction of the pressure;

Figure 11 is a view of the cylinder of Figure 10, the arrow showing tangential application of a cutting force to such a cylinder for forming sheets which I have discovered produces a weakened sheet;

Figure 12 is a view partly in elevation and partly in section showing a modification;

Figure 13 is a sectional view on the line 13—13 of Figure 12;

Figure 14 is a fragmentary detailed sectional view of the top of the mold shown in Figure 12; and Figure 15 is a fragmentary detailed sectional view of the bottom of the mold and platform shown in Figure 12 and taken on the line 15—15 of Figure 13.

The method and apparatus of the present invention are particularly concerned with the manufacture of a cork composition, which in sheeted form and the article produced therefrom exhibits enhanced tensile strength and freedom from brittleness. These are important considerations in the manufacture of bottle cap liners and gaskets which of necessity are subjected to high sealing pressures.

*Apparatus*

Referring to the drawings, a supporting frame 10 comprising vertically extending spaced bars or members 11 and cross bars 12 connected to the same, is employed. This frame may be set on the floor or a suitable base 13.

Carried by the frame is a movable or sliding platform 14 shown in detail in Figure 3. Referring to Figures 1 and 3, this platform has extending from its sides pairs of spaced guides 15. Carried by the vertical frame members 11 are guide rods 16 fixed to the frame by means of suitable brackets 16'. These guide rods 16 are freely received in the guides 15 of the sliding platform 14 and constitute a guiding and centering means therefor.

The movable platform 14 is connected to a reciprocating piston rod 17 carrying a piston working in a cylinder 18, and this connection is (a) through a cross head 19 rigidly connected by a nut 20 to one end of piston rod 17 and reciprocated therewith whereby the cross head is movable with the piston rod, and (b) by means of a pair of sprocket chains 21 each connected as at one end 21' to one end of the cross head 19 and working over sprocket wheels 22—23; the opposite ends of chains 21 are connected as at 24 to suitable rods 25 carried by the guide brackets 15 of platform 14. In this manner, movement of the piston rod 17 will move the platform 14, and likewise movement of the platform will act to move the piston rod and its piston against the pressure in cylinder 18.

Referring to Figure 3, the platform 14 has a plurality of spaced upwardly extending centering pins 27, which are adapted to engage and center a cylindrical and open ended mold member 28, detachably carried by the platform 14. The platform 14 is also provided with a central boss 29 and an offset locking pin 30, which engage openings in one end or bottom 32 of a closed tubular core 31, to center the core and hold it against rotation on the platform. As will be observed, the outer mold member 28 and the core 31 are mounted on the platform 14 and hence are movable therewith. Said mold member and core as shown are detachable from the platform, and form between them an annular mold cavity.

Figure 2:
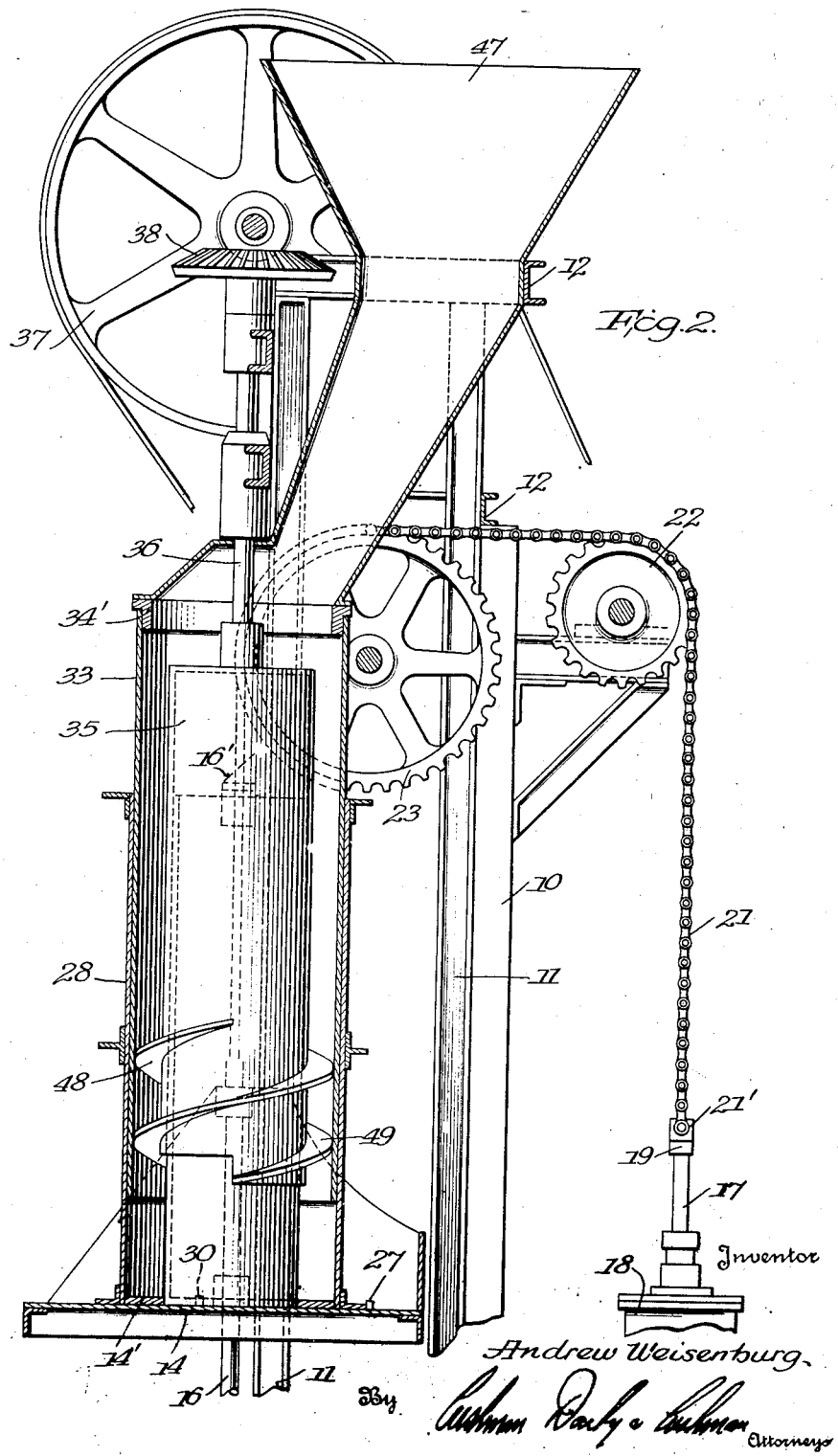
Figure 2 is a central cross section of Figure 1 showing the platform and mold in their elevated positions.

Carried by the frame 10 is a tubular member or shell 33 fixed to the frame by means of a bracket 34 connected to frame members 11 as at 34' and shown in Figure 2. Positioned within the shell 33 is a revoluble drum or feeder 35 which is rotated and supported by a drive shaft 36 which is operatively connected to pulley 37 through gearing 38. The pulley is operated in any desired manner to rotate the drum or feeder 35.

The mold members 28 and 31 carried by platform 14 cooperate with the fixed shell 33 and rotatable drum 35. Referring to Figure 4, it will be noted that these several parts are slidably nested i. e., the shell 33 fits within the mold member 28 and the core 31 of the mold fits within the rotatable drum 35. The purpose of this construction will be later described.

Referring to Figure 5, the outer cylinder 28 of the mold is preferably formed of the sections 40 and 41 provided with laterally disposed tapered bosses 42 which, when brought together, form a tapered pin 43 arranged to receive a locking member 44 having a complementary tapered opening 45 for maintaining the sections 40 and 41 in their closed positions. This construction allows these sections to be readily opened for removing the molded material after the latter is formed. The outer surface of the cylindrical member 28 may be provided with spaced strengthening bands 46.

The granulated binder coated cork is introduced into the machine from hopper 47 as shown in Figure 1, and with the mold members 28 and 31, and the shell 33 and rotatable drum 35, in the nested position shown in Figures 1 and 4. In such relation, the annular plate or disc 14', detachably mounted on the platform 14, closes the space at the bottom between the members 28 and 31. The platform and members 28 and 31 carried thereby are supported in this position by reason of the retraction of the piston rod in the cylinder under the pressure exerted upon the piston therein. That is, the pressure in the cylinder 18 is such that the piston rod 17 is moved downwardly whereby the platform 14, shell 28 and core 31 are moved upwardly so that the tubular members nest and the plate 14' forms a closed bottom for the nested members working against the pressure in cylinder 18.

The rotatable drum 35 I have heretofore mentioned as a feeder and in this connection, referring to Figure 2, it will be noted that at its lower end the drum has a pair of separate blades 48 and 49. These blades extend spirally from opposite sides of the drum, forming a double blade feed, one convolution beginning and ending on one side of the diameter and the other convolution beginning and ending on the opposite side of the diameter. This double convoluted feed screw of the structure recited not only constitutes an efficient feed, but, of equal importance, exerts a positive rotary and axial pressure and assures thorough distribution of the binder coated cork to form a cylindrical object of uniform density. As will be observed (Figures 2 and 4), each screw extends for only a single convolution around the drum 35, with the result that there is no appreciable friction between the cork and the wall of the shell 33 as the cork is propelled by the screw and thus there is no substantial preforming or compression of the cork before it is introduced into the annular cavity of the mold beneath the screw. The short formation of this screw is of particular importance since it permits the introduction into the mold cavity of substantially free and uncompressed cork.

With the parts in the position shown in Figures 1 and 4, the granulated cork is continuously fed from the hopper 47 and enters the spaces defined by the shell 33 and the rotatable drum 35. The granular mass gravitates as a substantially free uncompressed mass into engagement with the rotating blades 48 and 49 on the drum 35, and these blades pack the binder coated comminuted cork between the mold 28 and core 31 against the plate 14' removably positioned on the platform 14. The pressure in the cylinder 18 is regulated and as the packing continues, the platform and mold members 28 and 31 are moved downwardly away from the fixed shell 33 and drum 35 as shown in Figure 2 without disturbing the feed passage defined by the inner and outer members, and until the material builds up on the platform to substantially the height of the mold and core. This packing, it will be noted, takes place against the packing pressure exerted on one side of the platform and the fluid pressure obtained in the cylinder exerted on the opposite side of the platform. As will be understood, the pressure exerted by the spiral convolutions on the feed drum 35 and by the platform is only upon the cork in the mold cavity since the cork above the spirals 48, 49 is free and uncompressed. Thus there is maintained upon the cork as the cylindrical body is progressively and continuously formed, a continuous endwise or axial pressure which is not transmitted to the cork above the body in the mold cavity due to the fact that the spirals completely fill the space between the drum 5 and the shell 33 (Figure 2). The short single convolution of each spiral avoids any appreciable packing or compression of the cork within the spirals since it travels only a short distance and there is no such friction created between the cork and the walls of the shell 33 as would cause a packing or compression of the cork in the spirals.

In operation, the initial pressure in the cylinder 18 will be such as to move the platform 14 to bring this member into engagement with the lower end of the shell member 33. The pressure in the cylinder is then increased to a predetermined amount and regulated as required in order to yieldably oppose the downward pressure exerted on the mold and platform during the packing operation to obtain a cork composition cylinder of desired density. The granulated cork and binder are introduced into the mold, and rotary movement imparted to the drum 35 through the gearing 38 and pulley 37. The downward feeding and packing pressure exerted by the double blades 48 and 49 packs the material into the mold and as this pressure is greater than the set pressure in the cylinder 18, the platform 14, together with the cylinder member 28 and core 31, are gradually moved away from the fixed member 33 until the cylinder body is completely formed, at which time the upper end of the member 28 is spaced from the opposed lower end of the member 33 so as to permit the convenient removal of the mold from the platform. During this operation, the core 31 is prevented from turning, due to the locking engagement of the pin 30 with the bottom of the core.

The screw or blades 48—49 exerts continuously a rotary and axial packing pressure whereby the cork is extruded and packed to build up a cylinder of uniform density, the density factor being controlled by the pressure in cylinder 18.

The screw, moreover, imparts a simultaneous axial and rotary pressure on the cork so that the granules are oriented to lie in a path which is the resultant of these two forces.

As the extrusion and packing continues, the cylinder of cork composition is built up to substantially the height of the members 28 and 31 whereupon the extruding and packing and cork feed operation is discontinued. In this position of the parts, the members 28 and 31 are free of the shell 33 and drum 35, i. e., below the same, and are removed from the machine with the ring 14' closing one end of the space between the members 28 and 31. A cover ring 14' is now applied to the opposite end of the members 28 and 31 as shown in Figure 5, so that both ends are closed. The machine is then ready for a continuation of the operations described.

The floor 13 may have a well or recess 50 for receiving and supporting the cylinder 18. Any suitable fluid such as air, water, or oil may be used to actuate the piston and piston rod 17, and the flow of the fluid supply to the cylinder is preferably controlled by a valve 51.

Referring to Figure 12, I have illustrated the mold supporting platform 14 as movably supported upon a platform supporting means 70 carried by the end of a piston 71 working in a cylinder 72 carried by the base 13. The mold supporting means includes a pair of angle irons 73 connected to a hub and bolted to the platform as shown. In this figure, the mold has been shown at the limit of its downward travel at which time, the shell 33 and drum 35 are disposed above the mold. As distinguished from the previously described construction, there is now positioned upon the top of the cork a ring 74 and disposed upon the top of this ring to rest thereon is a removable pressure member 75 in the form of a ring having a plurality of downwardly extending feet 76 resting upon the upper surface of the ring 74. With the parts in this position as shown in Figure 12, fluid is introduced to the cylinder 72 through the opening 77 whereupon the mold is elevated and the upper surface 78 of the ring member or pressure member 75 is caused to engage the lower end of the drum 35. In this manner, the ring 74 is pressed in place at the end of the mold and any loose cork in the end of the mold is likewise compressed. In order to maintain the ring member 74 in position under pressure of the compressed cork, the side wall of the mold is formed with a plurality of spaced locking dogs 79 which as shown in Figure 14 have a reduced end 80 disposed loosely in spaced openings 81 in semi-circular brackets 82 secured as by welding to the wall of the mold. As many dogs may be employed as desired. At their upper ends, the dogs extend through openings 83 in the mold wall and openings 84 in the adjacent strengthening angle irons 85. The angle irons 85 are formed in semi-circular sections and carry spaced angle brackets 86 to the rear of the dogs which cooperate with the brackets 82 to hold the dogs in position. It will be understood that as the plate 74 is pressed downwardly by the member 35, its periphery engages an inclined surface 87 of each dog to move the same outwardly and after the ring passes the dogs and is disposed in position within the mold as shown in Figure 12, the dogs are pressed inwardly manually or by springs if desired so as to engage the ring 74 at its upper marginal surface as shown at 88 in Figures 12 and 14 and lock the same in position. Thereupon the pressure member 75 is removed from the top of plate 74.

Referring to Figure 12, the lower portion of the sectional mold members 28 are provided with a plurality of spaced blocks 89 preferably welded to the mold sections and upon which the bottom ring member 14' is loosely supported. Secured to the platform 14 by bolts 90 is a mold core centering and locking means 91 for the core member 31. This centering and locking means comprises a plate or disk 92 supported upon a plurality of integral legs 93. The disk at its periphery is provided with suitable arcuate slots 94 best shown in Figure 13. The mold core 31 at its lower end is provided interiorly with a plurality of blocks or lugs 95 preferably welded to the core. In assembling the mold, the member 91 is fixed in position and thereafter the core member 31 is disposed about the same, the blocks 95 first passing through the slots 94 whereupon the member 31 is turned to move the lugs 95 out of alignment with said slots beneath the overhanging edge of the disk 92. It will be seen then that the member 91 not only centers the core member 31, but locks the same detachably in position as well. The mold members 28 are sectional as stated and each is provided with the semi-circular angle iron strengthening members 85 similar to the members 46 shown in Figure 5, the members 85 being welded to the mold sections. The two halves of the mold are provided with lugs 96 adapted to receive tapered locking pins 97, by which the sections are firmly locked in position but may be readily disconnected, to allow access to the cylinder.

*Method*

By reference to the preceding description, it will be observed that the cork composition is extruded and packed by a simultaneous rotary and downward axial pressure. The cork is continuously fed into the annular mold cavity by the rotating drum 35 from the free uncompressed body of cork in the shell 33 above the spiral feed blades 48 and 49. Thus the hollow cylindrical core body is continuously and progressively formed and the cork as introduced into the mold cavity is substantially free and uncompressed, the individual cork particles being thus permitted to move more or less independently into the proper positions and produce a body having uniform density.

During the continuous formation of the hollow cylindrical cork body there is maintained on the latter a continuous endwise or axial pressure resulting from the continuous feed of the blades 48, 49 at one end and the upward pressure on the platform 18 at the other end of the body. The method is particularly useful in the formation of a hollow cylindrical body as distinguished from a solid rod since it permits the subsequent tangential cutting of the sheets from cylindrical sections having relatively long radii as distinguished from relatively small rod sections. Moreover, by the method described there is no central section of small diameter which is not adaptable for tangential slicing and which would therefore be wasted.

There results a cork composition cylinder wherein the cork particles are arranged or oriented to occupy a position which is the resultant of these forces, which resultant is substantially along radial lines.

After the cylinder is formed and the cover plate 74 applied on the machine, or the cylinder removed and the cover plate 14' applied thereafter, the cylinder enclosed in the mold members 28 and 31 and the top and bottom ring members is transferred to a continuous type oven 52 and passed therethrough to cure or set the binder. Thereupon the sectional mold members 28 and top and bottom ring members 14' and/or 74 are removed and there remains the core 31 having a cork composition cylinder 53 thereon.

This cylinder and core are mounted on a cutting machine having a travelling cutter blade 54 in the form of an endless band moving longitudinally with respect to the cylinder 53 continuously over suitable pulleys and having its cutting edge disposed tangentially as shown at 56 to the cylinder. The cylinder and core are rotated as shown by the arrows 61 on a suitable shaft 55 of the cutting machine which engages the core 31 and simultaneously the tangentially disposed cutting blade engages the cylinder, the blade moving in the direction indicated by the arrow 62. In this manner, the cork composition is severed into a continuous sheet 57 of required thickness which may be wound on a roll 58 if desired, and in which event the rotation of the cylinder and core, and the roll 58, respectively, is accomplished in synchronism. Either the cutting blade or the shaft 55 is moved progressively toward one or the other as each layer is removed from the cylinder 53 in order to constantly maintain the cylinder and cutter in cutting relation.

I have discovered that by forming the cork composition cylinder through the medium of a downward axial and rotary pressure such tangential cutting into sheets may be availed of to form a uniform sheet of high tensile strength. The cork particles, as stated, are oriented to have a position which is the resultant of the two forces and which force resultant lies along substantially radial lines. Hence, the application of a tangential cutting force as explained will be at substantially right angles to the radial line pressure employed in forming the cylinder. It is this feature of the present invention which enables the formation of cork composition sheets in the manner described, possessing remarkably strong characteristics and free from weakened areas.

In Figure 9, I have illustrated a block of cork composition formed conventionally in a suitable square mold and wherein the cork composition is subjected to, i. e., compressed by, a downward or vertical pressure as indicated by the vertical arrows. The severing of this block into sheets is accomplished at right angles to this downward molding pressure as shown by the horizontal arrow. Such sheets have a tensile strength which is sufficiently strong to make the cork composition practically useful.

Referring to Figures 10 and 11, I have illustrated a cork composition cylinder formed conventionally by a simple downward reciprocating pressure, i. e., the cork composition is compressed in a tube by a reciprocating plunger or packer. Such a cylinder, when subjected to a tangential cutting for the purpose of forming cork composition sheets, results in a sheet which is weak and has little or no utility. This appears due to the fact that the cutting is not accomplished at right angles to the packing pressure, with the result that the cork particles are strained and the bond between them is ruptured.

The present invention, however, utilizes as the packing force, two components, namely, an axial pressure and a rotary pressure, and the cork particles are positioned in accordance with the resultant of these two forces. As stated, this resultant is substantially along radial lines, and when the cylinder is subjected to a tangential cutting, as described, the cutting force acts at substantially right angles to the radial resultant force. In this manner, a highly desirable sheet of required thickness and tensile strength is obtained.

In Figure 8 I have shown the sheet 57 and an automotive gasket 59 and a cap liner 60 punched or cut therefrom.

The cork composition employed comprises a body mass of comminuted cork, i. e., the cork predominates by volume and the granules are coated with a binder which may be of any suitable type.

It will therefore be seen that, by reason of my improved method and apparatus, the cylindrical body for forming sheet material may be economically and expeditiously produced at a minimum expenditure of time and labor, while the formed sheet and articles made therefrom will have increased tensile strength in the directions subjected to the greatest strains.

It is understood that the improved method and apparatus herein disclosed are merely illustrative of preferred embodiments and that such changes as fall within the purview of one skilled in the art may be made without departing from the spirit of the invention and the scope of the appended claims.

This application is a continuation-in-part of my copending application Serial No. 748,713, filed October 17, 1934, which has become Patent No. 2,126,435.

I claim:

1. In a filling and packing machine of the class described, the combination of an axially movable platform supporting a mold having a core and a spaced outer member, a detachable ring member supported on the platform and forming the bottom of the space between the core and the outer member, a fixed tubular member associated with the mold and arranged to extend within the outer member, a revoluble drum within the fixed membr, means for normally maintaining the mold in telescopic relation with the fixed member, means for introducing granulated material and a binder into the mold to form a cylindrical body, and means on the lower end portion of the drum for packing the material into the mold and moving the mold away from the fixed member during the packing operation, said last mentioned means applying a continuous axial and rotary pressure to the material.

2. In a filing and packing machine of the class described, the combination of an axially movable platform supporting a mold having a core and a spaced outer member, a detachable ring member forming the bottom of the space between the core and said outer member, a fixed shell associated with the core and arranged to extend within the outer member, a revoluble drum within the fixed member, means for normally maintaining the mold in telescopic relation with the fixed member, means for introducing granulated material and a binder into the mold to form a cylindrical body, and said drum having double blades on the lower portion thereof for packing the material into the mold and moving the mold away from the fixed member during the packing operation, said blades applying a continuous axial and rotary pressure to the material and extending spirally from opposite sides of the drum, one convolution beginning and ending on one side of the diameter and the other convolution beginning and ending on the opposite side of the diameter.

3. A filling and packing machine of the class described having in combination, a frame, a support movably connected to the frame, a mold carried by said support, said mold having a core and a spaced outer member, a fixed shell arranged to extend within the outer member, a revoluble drum associated with the fixed member and arranged to fit over said core, said core having a closed bottom provided with an opening, said support having a boss extending through said opening, means for preventing rotation of the core when mounted on the support, means for normally maintaining the mold in telescopic relation with the fixed member and drum, a pair of double spaced blades extending in a single convolution about the lower portion of said drum, means for actuating said drum, said blades packing the material by a combined axial and rotary pressure, the packing action of said drum and blades moving the support and the mold carried thereby away from the fixed shell and drum, and means connected to said support and controllable to resist such movement of the support, whereby the densities of the packed product may be regulated, said last mentioned means comprising a piston operating against fluid contained in a cylinder.

4. A filling and packing machine of the class described having in combination, a frame, a support, movably connected to the frame, a mold carried by said support, said mold having a core and a spaced outer member, a fixed shell arranged to extend within the outer member, a revoluble drum associated with the fixed member and arranged to fit over said core, said core having a bottom provided with a central opening formed with an off-set recess portion, said support having a boss extending through said opening and a pin fitted in said recess for preventing rotation of the core on said support, means for normally maintaining the mold in telescopic relation with the fixed member and drum, a pair of double spaced blades extending in a single convolution about the lower portion of said drum, and means for actuating said drum.

5. In a packing machine of the class described, a movable platform, an axially mold detachably positioned on the platform, said mold comprising an inner tubular core and an outer cylindrical member, a detachable ring member supported on the platform and forming the bottom of the space between the core and the outer member and means on the platform for preventing rotary movement of the core during the pressing operation.

6. In a packing machine of the class described, a movable platform, and an axially mold detachably positioned on the platform, said mold comprising an inner tubular core and an outer cylindrical member, a detachable ring member supported on the platform and forming the bottom of the space between the core and the outer member, said platform having an upwardly projecting member arranged to fit into a complementary opening in the bottom of the core for preventing rotary movement of the latter during the packing operation.

7. In a packing machine of the class described, a movable platform, an axially mold detachably positioned on the platform, said mold comprising an inner tubular core and an outer cylindrical member, a detachable ring member supported on the platform and forming the bottom of the space between the core and the outer member, said platform having a boss arranged to extend through a central opening in the bottom of the core, and means on the platform engaging complementary means on the core for preventing rotary movement of the latter during the packing operation.

8. In a packing machine of the class described, a movable mold comprising an axially central core and a spaced cylindrical member each detachably fixed with relation to the other, a detachable ring member forming the bottom of the space between the core and cylindrical member, a fixed shell arranged to extend into said cylindrical member, and a rotary feeder positioned within the shell and surrounding the core, said feeder having double spaced blades extending in a single convolution about its lower end whereby to impart a combined axial and rotary pressure to the material during the packing operation.

9. In a filling and packing machine of the class described the combination of an axially movable mold having spaced mold members, a detachable ring member forming a bottom of the space between said mold members, means for introducing the granulated material and a binder into the mold space to form a cylindrical body, and means for compressing the cylindrical body at the ends thereof.

10. In a filling and packing machine of the class described the combination of an axially movable mold having spaced mold members, means for introducing the granulated material and a binder into the mold space to form a cylindrical body, means for compressing the cylindrical body at the ends thereof, the means for compressing the cylindrical body at the ends comprising a movable support for a platform upon which the mold members are carried, said support cooperating with a detachable member disposed at the opposite end of the mold, and a fixed member, whereby movement of said support will compress the packed material between the platform and said fixed member.

ANDREW WEISENBURG.